(12) United States Patent
Löffler

(10) Patent No.: US 6,351,997 B1
(45) Date of Patent: Mar. 5, 2002

(54) METHOD AND DEVICE FOR CHECKING SCREWED CONNECTIONS

(76) Inventor: Thomas Löffler, Rosenheimer Str. 62, Miesbach 83174 (DE)

( * ) Notice: Subject to any disclaimer, the term of this patent is extended or adjusted under 35 U.S.C. 154(b) by 0 days.

(21) Appl. No.: 09/446,943

(22) PCT Filed: Apr. 30, 1999

(86) PCT No.: PCT/DE99/01279

§ 371 Date: Dec. 30, 1999

§ 102(e) Date: Dec. 30, 1999

(87) PCT Pub. No.: WO99/57532

PCT Pub. Date: Nov. 11, 1999

(30) Foreign Application Priority Data

Apr. 30, 1998 (DE) .......................................... 198 19 301

(51) Int. Cl.⁷ ................................................ F16B 31/02
(52) U.S. Cl. .................................................... 73/761
(58) Field of Search ........................................... 73/761

(56) References Cited

U.S. PATENT DOCUMENTS

| | | | |
|---|---|---|---|
| 3,943,819 A | | 3/1976 | Charron .......................... 85/62 |
| 3,954,004 A | * | 5/1976 | Orner ............................ 73/761 |
| 4,636,120 A | * | 1/1987 | Brandsberg et al. ........... 73/761 |
| 4,676,109 A | * | 6/1987 | Wallace ......................... 73/761 |
| 4,846,001 A | * | 7/1989 | Kibblewhite .................. 73/761 |
| 5,226,765 A | * | 7/1993 | Walton .......................... 73/761 |

FOREIGN PATENT DOCUMENTS

FR 1512090 4/1968

* cited by examiner

Primary Examiner—Max Noori
(74) Attorney, Agent, or Firm—Jacobson Holman, PLLC

(57) ABSTRACT

A method and a device for checking a screwed connection and to special screws to implement the method. The method is based on the utilization of a special screw with a one-piece cored hole pressing together two components with a prestress force. The method includes determining the original length of the special screw by measuring the length of the cored hole; determining the length of the special screw when stressed by measuring the distance from the head of the screw to the bottom of the bore and comparing the measuring values of the lengths with predetermined data. According to predetermined criteria, it is determined whether sufficient prestress force has been applied or whether it is necessary to further tighten the screw. The device for checking the prestress force includes the special screw and a length measuring device determining the distance from the base surface of the cored hole to the screw head and the distance between the front face of the core of the cored hole to the screw head.

4 Claims, 1 Drawing Sheet

METHOD AND DEVICE FOR CHECKING SCREWED CONNECTIONS

FIELD OF THE INVENTION

This invention relates to a method and a device for checking a screwed connection, and it can be used preferably to check a screwed connection in industrial production, in workshop operations and for monitoring in plant engineering in cases where there are high safety requirements. This invention also relates to special screws for carrying out this method.

BACKGROUND OF THE INVENTION

It is known in the state of the art that electronically controlled screw systems are being used to an ever increasing extent in industrial production; these screw systems tighten the screws at a predetermined torque and press the parts to be screwed together at a predetermined force. This force is known as the initial tension force or prestressing force and it occurs due to the change in length of the screw shaft, which is referred to below as elongation.

In many applications, it is necessary to determine the prestress force with a high accuracy after production of the connection. Thus, the quality of the connection can be tested by customer service, for example, without having to release the connection and establish it again.

It is known from the state of the art that the prestress force of a screwed connection can be tested indirectly by measuring the releasing torque or the tightening torque. However, these methods are very inaccurate due to the fluctuations in friction in the screw thread and under the screw head and due to the alternation between adhesive friction and sliding friction; furthermore, the prestress force changes during the testing process.

To reduce the influence of friction in testing, methods that determine the prestress force of the screwed connection by measuring the length of the screw are known. To determine the prestress force from the length of a screw, the exact starting length of the unstressed screw must be known. However, this is impossible in mass production in practice due to the great screw tolerances, or it is possible only at a very great expense.

Another possibility of checking the prestress force is by directing an ultrasonic beam into the screw and measuring the transit time of the ultrasonic beam in the screw. By introducing longitudinal and transverse waves, it is possible to determine the prestress force of a screw without knowing the starting length. However, major technical difficulties must be overcome with this method. Thus, for example, this method functions only with screws of a certain geometry, and it is extremely difficult to introduce a transverse wave, and the accuracy of the testing method for determining the prestress force is lower than in the methods used in producing the screwed connection.

SUMMARY OF THE INVENTION

The object of this invention is to improve upon the testing of the quality of screwed connections to overcome the problems described above.

This object is achieved with a
checking, with a
checking, and a
screw.

The checking method for screwed connections has the following process steps:

determining the original length of the special screw by measuring the length of the core of the core hole, determining the length of the special screw in the stressed state by measuring the distance from the screw head to the base of the bore, comparing the measured length values thus obtained with predetermined data, determining according to predetermined criteria whether the prestress force is sufficient or whether the screw must be tightened.

The main advantage of this method is that the original length of the special screw can be determined by measuring the length of the core of the core hole, because the core is not elongated when tightening the screw. In producing the core hole bore, the core length and the bore depth are always exactly the same, so it is necessary only to compare the length of the bore of the stressed screw with the length of the unstressed core. The difference between these two measured results is the elongation of the screw shaft under prestress, from which the prestress force can then be calculated according to equations with which those skilled in the art are familiar.

Advantageous refinements of this method can be derived from claims 2 through 4.

To measure the depth of the core hole bore and the length of the core, measurement methods known from the related art can be used. In particular, it is also possible to use different methods to measure the depth and the length. It is important only that the measurement methods must meet certain conditions with regard to accuracy and reliability.

The device for checking screwed connections has the following features: a length measuring device which determines the distance between the screw head and the base of the core hole bore and determining the distance between the screw head and the end face of the core of the core bore.

The advantages of this checking device are that the length measuring device available in the state of the art can largely meet all the requirements postulated here and can be acquired inexpensively, so that an optimum configuration of the same or different measurement systems can be compiled, depending on requirements.

According to the invention, the length measurement devices which supply electric measurement data which are sent to an electronic data processing unit where the measured data are compared with stored data and a decision is made as to whether the prestress force is sufficient or whether the screw must be tightened further. Further tightening of a screw can be accomplished with techniques known from the related art, i.e., either manually or at another workplace.

According to the invention, a tightening device is also provided, further tightening the screw with a further tightening decision on the part of the electronic data processing system until the intended prestress has been reached. Then, the screwed connection can be checked again with increased accuracy demands.

The screw according to the invention has an annular gap which is covered or filled with a suitable material. Elastic compounds or greases are also suitable, for example.

BRIEF DESCRIPTION OF THE DRAWINGS

Additional measures and advantages of this invention are derived from the following description of embodiments in combination with the accompanying schematic drawing, where this invention is based on all new features or combinations of features that can be derived therefrom, even if they are not stated explicitly in the claims.

DETAILED DESCRIPTION OF THE PREFERRED EMBODIMENTS

Figure 1:
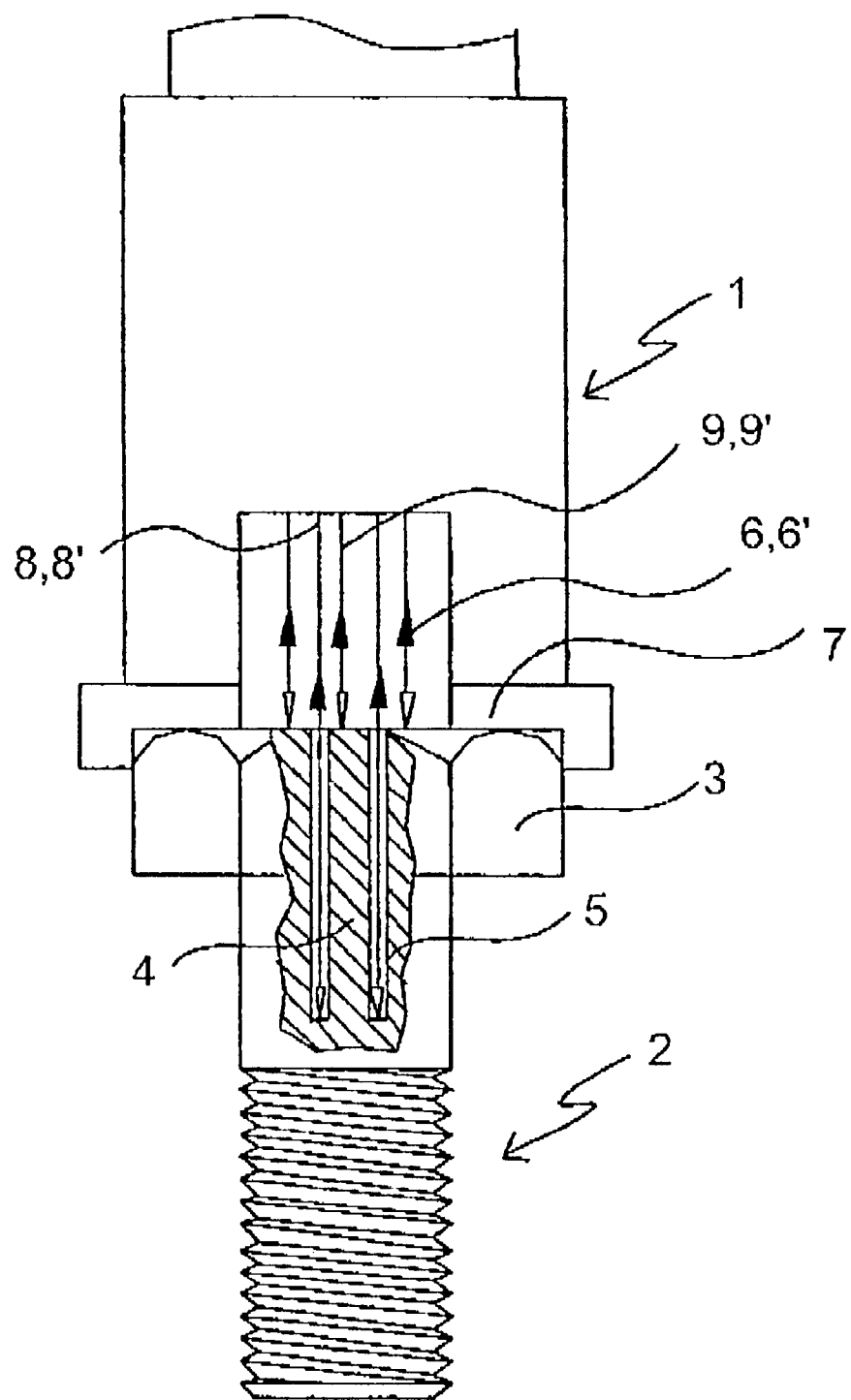
FIG. 1 shows an optical embodiment of this device on a core hole screw.

Device 1 sits on the head 3 of the screw 2 which has a core hole bore with a bore core 4 and an annular gap 5. An optical length measuring device (not shown) is arranged in device 1, emitting measurement light beams 6 at a defined surface 7 on screw head 3. The measurement light beams 6 are reflected from the surface 7 and then received as reflected beam 6' by the length measuring device. Likewise, measurement light beams 8 are reflected by the bottom of the ring gap as reflected beams 8' and are received by the length measuring device. In addition, measurement light beams 9 are reflected as reflected beams 9' by the end face of the bore core 4 and are received by the length measuring device.

Before tightening the screw, the bore core 4 and the annular gap 5 were the same length. When the screw is tightened, the screw shaft is lengthened, so the length of the annular gap 5 increases based on the surface 7, but the length of the bore core 4 remains unchanged. This effect yields the possibility of determining the original length of the annular gap 5 according to the following equation:

Original length of the annular gap=instantaneous length of the annular gap (based on surface 7) minus the difference in height between the surface 7 and the end face of the bore core 4.

Since the original absolute length and depth and the instantaneous length and depth of the core bore are known, those skilled in the art can calculate the prestress force using known computation methods of strength mechanics in combination with the known dimensions of the screw and its elastic modulus.

What is claimed is:

1. A method of checking a prestress force within a screw set to connect two parts together under said prestress force, the screw having a head, a shaft and a longitudinal hole in said shaft, said longitudinal hole having a closed end within said shaft and an open end on an outer surface of said head, and a longitudinal core in said hole, one end of the core being fixed to the shaft at the closed end of the hole, a free end of the core being adjacent to the open end of the hole, the method comprising the steps:

measuring a first distance of the closed end of the hole to a checking device fixed to the screw opposite to the open end of the hole, measuring a second distance of an outer surface at the free end of the core to said checking device, calculating the length of the core as the difference of the first and the second distance, measuring a third distance between the open end of the hole and said checking device, calculating the length of the hole as the difference of the first distance and the third distance, calculating a fourth distance between the free end of the core and the open end of the hole as the difference of the lengths of the core and the hole, and calculating the prestress force as a function of said fourth distance in relation to the length of the core.

2. A method according to claim 1, wherein the distances are measured optically.

3. A device for checking a prestress force within a screw set to connect two parts together under said prestress force, the screw having a head, a shaft and a longitudinal hole in said head and said shaft, said longitudinal hole having a closed end within said shaft and an open end on an outer surface of said head, and a longitudinal core in said hole, one end of the core being fixed to the shaft at the closed end of the hole, a free end of the core being adjacent to the open end of the hole, said device comprising:

a seat fit for a releasable connection to the head of the screw;

a first measuring device for measuring a first distance to the closed end of the hole;

a second measuring device for measuring a second distance to the free end of the core;

a third measuring device for measuring a third distance to the open end of the hole; and a calculating device calculating the length of the core as the difference of the first and the second distance, and calculating the length of the hole as the difference of the first distance and the third distance, and calculating a fourth distance between the free end of the core and the open end of the hole as the difference of the lengths of the core and the hole, and calculating the prestress force as a function of said fourth distance in relation to the length of the core.

4. The device according to claim 3, wherein the measuring devices include optical measurement systems.

* * * * *